(12) United States Patent
Hoffman, III

(10) Patent No.: US 6,452,538 B1
(45) Date of Patent: Sep. 17, 2002

(54) SATELLITE SYSTEM FOR MONITORING SPACE

(75) Inventor: William A. Hoffman, III, Ridgewood, NJ (US)

(73) Assignee: Robill Products, Ridgewood, NJ (US)

( * ) Notice: Subject to any disclaimer, the term of this patent is extended or adjusted under 35 U.S.C. 154(b) by 0 days.

(21) Appl. No.: 09/663,430

(22) Filed: Sep. 16, 2000

(51) Int. Cl.⁷ .............................................. H04B 7/185
(52) U.S. Cl. ...................................................... 342/352
(58) Field of Search ................................ 342/356, 352; 356/139.01, 139.02

(56) References Cited

U.S. PATENT DOCUMENTS

| | | | | |
|---|---|---|---|---|
| 4,679,753 A | * | 7/1987 | Landecker | 244/171 |
| 4,746,976 A | * | 5/1988 | Kamel et al. | |
| 4,791,297 A | * | 12/1988 | Savoca et al. | 250/347 |
| 5,619,211 A | * | 4/1997 | Horkin et al. | 342/356 |
| 5,963,166 A | * | 10/1999 | Kamel | 342/357.01 |
| 6,002,360 A | | 12/1999 | Walcott et al. | |

OTHER PUBLICATIONS

The Hipparcos Space Astrometry Mission: Hipparcos the Stars. found on The Hipparcos Web group.

This reference is merely provided because it was mentioned in the Specification.

* cited by examiner

*Primary Examiner*—Theodore M. Blum
(74) *Attorney, Agent, or Firm*—Cozzarelli Law Firm, P.A.; Frank Cozzarelli, Jr.

(57) ABSTRACT

A low-cost satellite system and method for using it for continuously monitoring near space and providing real-time data, both astronomical and space-environmental, is described and claimed. Low cost is achieved by disposing outwardly facing active and passive detection means aboard telecommunications and other satellites, and providing data from such means to subscribers. The system and method enable practical means to monitor space for approaching foreign bodies, providing high quality information for e.g., underfunded educational institutions while making enhanced use of geostationary orbits, a scarce resource, among other benefits.

8 Claims, 3 Drawing Sheets

SATELLITE SYSTEM FOR MONITORING SPACE

TECHNICAL FIELD

The present invention relates generally to monitoring the space environment around a planet from platforms and satellites in geosynchronous orbit around said planet and providing the information gathered to subscribers who have a need for the information and its use. Monitoring by both passive (detection only) and active (propagation and detection) means is used to observe repeatedly or continuously features and events in the environment of interest. There are multiple applications of the present invention; it will be best understood in the context of a system, which will provide extensive, repeated updates of the contents of space surrounding a planet, such as earth.

BACKGROUND OF THE INVENTION

Several thousand satellites have been launched over the past 40-odd years since Sputnik. Many have been used to observe the earth, and some have traveled millions of miles to observe and in some cases monitor the surfaces of the giant planets and their moons; nearer at hand, others have monitored surfaces of Mercury, Venus and Mars for shorter or longer periods until their batteries ran out. By far, the most common observation purpose for these vehicles and/or satellites has been to determine the nature of the earth's surface and that of other planetary bodies within the solar system. Within this context one may include the geosurvey satellites, and the weather satellites, which, while less concerned with the surface itself than with atmospheric effects, are still primarily focused inwards, toward the primary (e.g., planet earth), passively observing the status of the atmosphere. Military satellites are also among the surface-observing sort. Many other satellites have been used to provide stable platforms for communications, from fixed, known positions relative to ground coordinates, of either the one-to-one type such as the telephone or one-to-many such as television. Data links via telephone enable planetary-based communications in some cases over the Internet, largely in the form of text electronic mail ("email"). Such satellites include the known commercial satellites; that is, communications, weather, geosurvey satellites, among others, and provide information with commercial value.

Substantially fewer satellites are engaged in the gathering of astronomical data, where advantages over ground-based observing include freedom from atmospheric effects, and absence of a daylight limitation. Atmospheric effects include the obvious ones of poor weather, light pollution and other visual disturbances, and the less commonly recognized normal filtering due to the atmosphere of certain electromagnetic radiation (EMR) frequencies like infrared (IR), ultraviolet (UV), some radio frequency wavelengths and x-rays. Special satellites for observing astronomical sources are known to include x-ray, infrared and ultraviolet detectors, and the Hubble telescope most famously gathers visible light. The Hipparcos telescope was designed to gather background images of stars to prepare a map of the sidereal sphere. Such satellites are deployed for academic and scientific purposes.

The special purpose astronomical satellites (x-ray, IR, UV) are often deployed in orbits convenient to observe particular directions of expected activity, and are not designed to gather wide views repetitively, but rather narrow, deep views. Similarly, the value of Hubble is in its light-gathering capability for deep-space viewing of emitting sources (and shadows due to intervening matter).

None of the above satellites has been designed or deployed for generalized monitoring of space, nor have they been deployed for commercial purposes. While some may arguably be addressed to enable some sense of such capabilities, they have been single-launch missions lacking the special combination of active and passive detection means, orbit location, programming, distribution channels and other infrastructure to accomplish the monitoring and presentation aims of the present invention and none has been reportedly used for such monitoring and presentation.

Ground-based systems, primarily visual telescopes are known to observe limited segments of the sky. Such systems suffer the deficiencies of all ground-based systems, however, including the aforementioned atmospheric limitations, night-only viewing periods, and gaps of information not gathered or gathered irregularly. A single radio-frequency telescope, at Arecibo, Puerto Rico, observes numerous segments of the radio-frequency spectrum, by definition as a detector of active signals, and specifically designed to filter out substantial noise in search of controlled signals. Ground-based interference is the most substantial contributor to the signals detected. None has means for active monitoring, as defined above, such means being impractical from ground-based systems. Neither ground-based systems nor satellite-based systems have been used to provide direct, real-time feed of information to a wide audience.

SUMMARY OF THE INVENTION

With the above limitations of the current technology in mind, it is an object of the present invention to provide both active and passive means for repeatedly monitoring space around an orbital body in space, above and free of the body's atmospheric interference, and to provide the information to a wide audience. According to the present invention, there is provided one or more satellites equipped with visual and other electromagnetic radiation (EMR) sensors and optionally, visible and other EMR transmitters facing away from the orbital body, so disposed and located as to provide information about the status of space, and interfaced with transmission to other like satellites, ground-stations and direct-feed customers. These and additional benefits of the present invention will become clear from the following description of the preferred embodiments.

An object of the present invention is to provide a system for monitoring of space near the planet for rendezvousing foreign bodies.

Another purpose of the present invention is the monitoring of space to provide information on bodies' positions, sizes, colors, motions and the like benefiting from the undistorted view of the heavens and frequent updating processes provided by the present invention.

Another object of the present invention is to provide a framework of use of geosynchronous satellites to economically monitor space.

The objects, advantages and features of the present invention are readily apparent from the following description of the preferred embodiment for carrying out the invention when taken in connection with the accompanying drawings.

The present invention is a method of utilizing a satellite system in orbit around a planet, such as earth, for conducting low-cost, wide-view, near-space monitoring; collecting astronomical and space-environmental information and transmitting said astronomical and space-environmental information to users who need that information. The satellite system comprises: modifying at least one telecommunications satellite of a telecommunications satellite system, said modifications comprising: an observation and detection means disposed on the outboard side of the satellite, a communications, command and control means for said observation and detection means. Then launching at least one said modified telecommunications satellite into a synchronous orbit around said planet; and orienting said modified telecommunications satellite so the telecommunications means face the orbited planet and the observation and detection means face generally away from said planet. Then controlling the operation and orientation of the observation and detection means independently of the host satellite system's operation and orientation system. The satellite system then is used for gathering astronomical and space-environmental information via the observation and detection means and providing an electronic output containing the astronomical and space-environmental information. Then transmitting said astronomical and space-environmental information to at least one ground-based station capable of receiving said astronomical and space-environmental information. The ground-based station comprises at least one, display means, retransmission means, signal processing, and interpretation means, a command and control communications means, and providing said astronomical and space-environmental information for a fee to various users.

DESCRIPTION OF THE PREFERRED EMBODIMENTS

Figure 1:
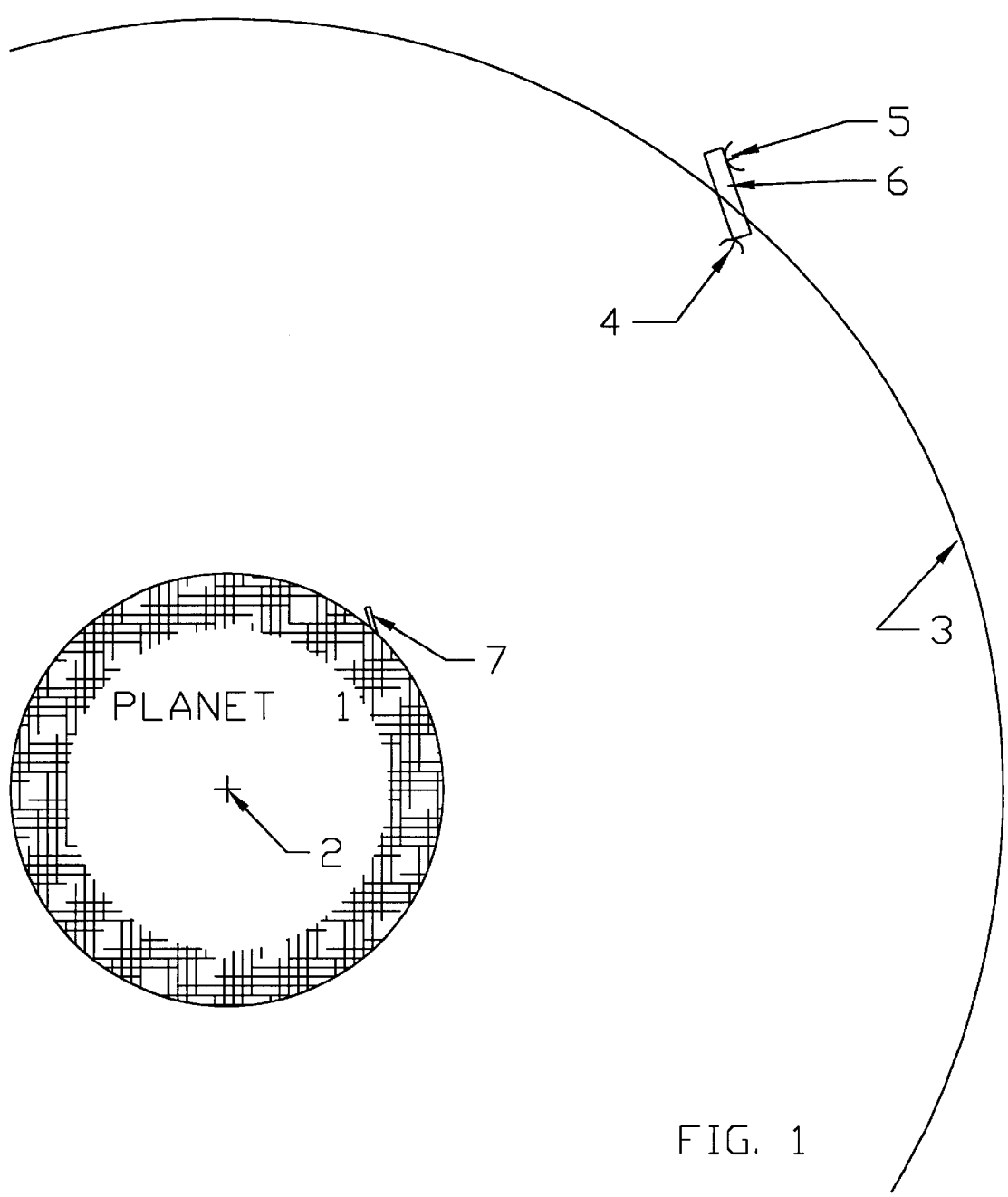
FIG. 1 is a diagrammatic view illustrating a planet (1) with an orbital path (3), on which is traveling a satellite (6).

A more complete appreciation of the invention and many of the attendant advantages and features thereof may be readily understood by reference to the following more detailed description of the drawings in which like reference characters indicate corresponding parts in all views and the detailed description.

In FIG. 1 is a diagrammatic view illustrating a planet (1) with a geostationary orbital path (3), on which is traveling a satellite (6) with two distinct features. Feature (4) depicts schematically the conventional antenna of a communication satellite, facing the planet (1) below, and feature (5) depicts schematically the active and passive detection systems of the present invention facing away from the planet. Feature (2) shows the center of rotation of the planet (1). Transceiver (7) on the planet's surface always points to satellite (6), when (3) is a geostationary orbital path.

Figure 2:
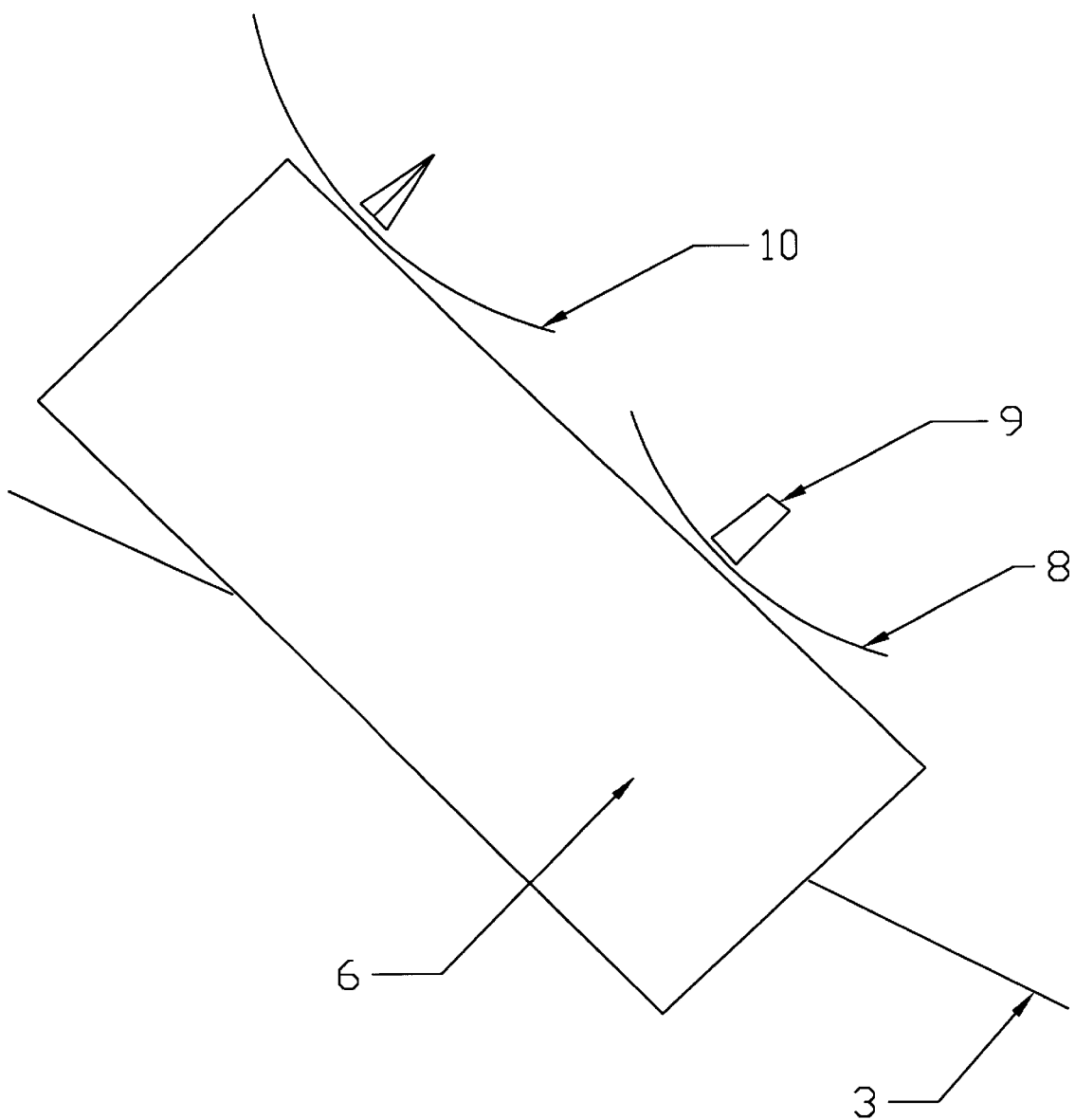
FIG. 2 is a diagrammatic view illustrating a schematic diagram of a communications satellite (6).

In FIG. 2 is a diagrammatic view illustrating a communications satellite (6) stripped of conventional antennas, photocell panels etc., to emphasize an outward facing active and passive detection system of the current invention. Feature (8) depicts a reflective surface of one element of an active and passive detection system depicting (9) the centrally disposed complex of detector means, illumination. Dish (10) depicts microwave transmitter/receiver, another component of the system of the current invention, and another type of active/passive means.

Figure 3:
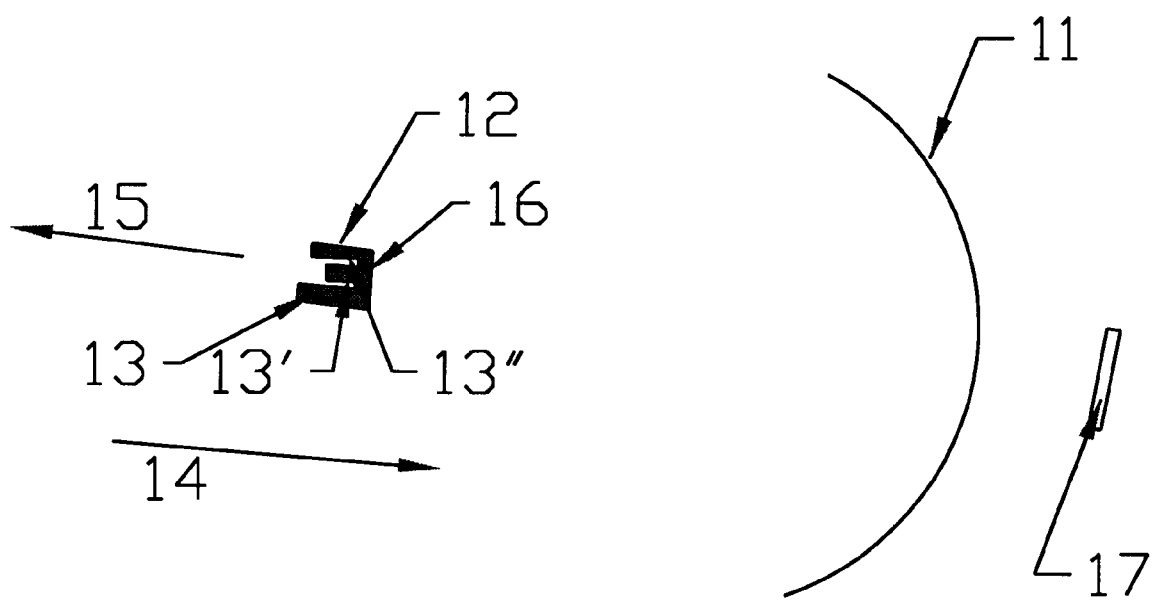
FIG. 3 is a diagrammatic view illustrating schematically the operation of one subsystem with active and passive elements.

In FIG. 3 is a diagrammatic view illustrating schematically the operation of one subsystem with active and passive elements. Feature (11) depicts a reflective surface for collecting incoming electromagnetic radiation (EMR) in the infra-red to ultraviolet (IR-UV) range (14) and focusing it on surface (16), which may be reflective, refractive or detection means. When (16) is reflective, light from (16) may be reflected further with or without focus means (not shown) to detection means (17). For illustration purposes, Schmidt-Cassegrain telescope configuration is recognized to be compact, and reflection detection takes place through the center of the reflective surface (11). On the outboard side of mirror (16) are disposed active means of illumination, such as lasers (12, 13). Additional lasers (13', 13") may provide additional wavelengths, or at least one of the lasers may be tunable. Illumination (15) is not detected in the absence of backscattering (e.g., from dust), exemplifying one of the benefits of the current invention. When reflected by some object in the illumination path, the returning EMR increases the total EMR (14) allowing spatial, spectroscopic and temporal (range) information to be extracted.

Although satellites in any orbit can support some of the features of the present invention, it is preferable for business and other practical reasons to practice the present invention on a platform of geostationary and geosynchronous satellites. Synchronous orbits are defined as those whose period is the same as the planet's natural rotation. Stationary orbits are synchronous orbits in which the orbit occurs near the equatorial plane of the planet, such that there is little or no apparent motion of the orbiting body. Earth-referencing leads to "geosynchronous" and geostationary" orbits, but the use of the term in the present invention is intended to include the more general cases. Such satellites are currently launched and replaced on regular bases, are large, relatively powerful, three-axis stabilized, and generally provide multiple communications wavelengths both in reception and transmission. They operate well outside atmospheric disturbances, cycle through very similar paths daily in orbit, and have a stability that enables well-controlled repeated or continuous observation. Additions and modifications required for the present invention will be relatively inexpensive compared with launch of single-purpose units.

Since a major purpose of the present invention is the monitoring of space near the planet for rendezvousing foreign bodies, the preferred embodiment employs one or more active detection systems, consisting of EMR transmitters of various wavelengths, including visible, infra-red, ultra-violet, microwave (radar), and appropriate detectors for the selected illumination frequencies as well as ambient sources of interest. Transmitters need not have corresponding detectors on the same or any other satellite, as when a transmitter provides illumination for ground-based detectors. In the context of monitoring space for rendezvousing foreign bodies, the present invention uses the capability of obtaining repetitive observations of the background of stars as a template for observing occultation by said foreign bodies. Occultation is the event of a dark body's blocking the light from a luminous or illuminated body and thereby becoming detected. Atmospheric distortions (such as starlight "twinkling") as well as particulate matter and other interference sources as described earlier make such an approach impractical from ground-based systems, and is another advantage of the present invention.

Another purpose of the invention is the monitoring of space to gather and provide information on other bodies' positions, sizes, colors, motions and the like benefiting from the undistorted view of the heavens provided by the present invention. The passive detection systems deployed on the geostationary or geosynchronous satellites of the present invention thus include charge-coupled devices (ccd's) sensitive to key wavelengths blocked by the planetary atmosphere (for example, ultraviolet (UV) is heavily filtered by earth's atmosphere), and high-definition (multi-megapixel) ccd detectors, and communicate with other satellites to establish baselines far larger than the planet below for triangulation of the distance to objects.

The baselines established are not only larger because of the distance of the satellite above the planet, but because in the combined motions of the planet and orbiting satellites, the day-to-day return to a given index position actually defines a line, for example in the case of planet earth, over 2 million miles long.

Another purpose of the invention is to provide a proper and accurate basis for "experiencing" space, including environmental factors with analogy to earth-based experience. Some of these are certainly forms of electromagnetic radiation, but are measured in aggregate or flux, rather than in focussed format, as with images of bodies, and are exemplified here for clarity of purpose. Thus, the passive detection systems include particle detection and sampling means, information from which may be processed electronically to yield information related to earth environmental features. For example, solar wind is an outflow of ionized particles from the sun, which is believed potentially a driving force for future spacecraft. It varies in ways analogous to wind on the earth, and its measurement can be converted to values to be reported, such as velocity, and strength, and even converted to physical effects such as sound. In another analogy, space has a temperature, often measured as a response to absorption of a generalized, unfocussed, "background" infrared radiation, and its variation with direction and time will be gathered and reported. Another example relates to larger scale rarefied dust (micrometeorites and smaller) which may be expected to vary in size distribution, quantity and velocity, and such information will also be gathered and reported in formats (e.g., tabularly, graphically, audially) familiar to subscribers.

Since a major purpose of the present invention is to provide information of the above type to subscribers, the detection systems are interfaced with the satellite to transmit information not only from the instant satellite, but from the combined results of multisatellite information collection as described earlier, to ground receivers comprising elements of the present invention which process and retransmit the information, as well as subscribers with direct display systems, process and display systems and other process and retransmit systems.

A number of additional advantages relating to the use of the satellite system of the present invention follow.

1. A satellite system with means for monitoring space facing generally away from the planet being orbited by detecting and collecting astronomical and other space environmental data that is free from atmospheric and diurnal effects.
2. A satellite system with means for monitoring space generally away from the planet being orbited by detecting and collecting astronomical and other space environmental data free from the limitations of poor weather, light pollution, and visual disturbances.
3. A satellite system with means for monitoring space facing generally away from the planet being orbited by detecting and collecting astronomical and other space environmental data from the normal filtering due to the atmosphere of electromagnetic radiation (EMR) frequencies like infrared (IR), ultraviolet (UV), some radio-frequency wavelengths, and x-rays.
4. A satellite system with means for monitoring space generally away from the planet being orbited for use in the generalized scanning of space. Such scanning enables collection and updating of a database of background stars, which form a template or matrix for observation of occultation.
5. A satellite system with means for monitoring space facing generally away from the planet being orbited with the special combination of spectrally-controlled or selected active illumination and passive detection means, geostationary and geosynchronous orbit, location and programming.
6. A satellite system with means for monitoring space facing generally away from the planet being orbited that is free of the deficiencies inherent in ground-based systems.
7. A satellite system with cost-effective means for monitoring space near a planet e.g., earth, for rendezvousing foreign bodies while facing generally away from the planet being orbited.
8. A satellite system with means for monitoring space facing generally away from the planet being orbited wherein the combined motions of the planet and orbiting satellite describes a path which on a day-to-day basis is over 2 million miles long.
9. A satellite system with means for monitoring space facing generally away from the planet being orbited to provide information to subscribers for use in and conducting their business.
10. A satellite system with means for monitoring space facing generally away from the planet being orbited to provide information to subscribers for use in and conducting their business, wherein said subscriber includes but is not limited to a university with means of its own for interpretation of data, but no funds/budget for erecting/populating an astronomical facility, or is a professional astronomical facility with requirement for secondary source of data for confirmations of observations, or is a non-specialist viewer interested in the pictures and weather in and of space.
11. A low-cost satellite system, deriving benefit from symbiosis with primary telecommunications satellites designed to operate in the most-preferred geostationary orbit, wherein the space environment information gathered is delivered both by narrow-cast to ground-based analytical systems and by broadcast directly to the satellites' existing telecommunications subscribers as content. The symbiosis is further enhanced by the protection for the primary satellites' purpose by the structures of the present invention, as well as by providing an advantaged basis for granting permission for one satellite's insertion into the limited region of geostationary operation over another, less broadly enabled satellite.

Alternative embodiments of practicing the invention, but within the spirit thereof, will, in the light of this disclosure, occur to persons skilled in the art. It is intended that this description be taken as illustrative only and not be construed in any limiting sense except by the following claims.

I claim:

1. A method of utilizing a telecommunications satellite in orbit around a planet for monitoring and collecting astronomical and space-environmental information and transmitting said astronomical and space-environmental information to the planet which comprises:
   a. modifying the telecommunications satellite by providing:

i. monitoring means including observation and detection means and collecting means, and disposing same on the outboard side of the satellite, and ii. communications, command, and control means for said monitoring and collecting means;

b. launching said modified telecommunications satellite into an orbit around said planet;

c. orienting said modified telecommunications satellite in such a manner that the communications means faces the orbited planet and the monitoring and collecting means are exposed to space and its environment;

d. collecting astronomical and space-environmental information via collecting means and providing an electronic output containing said astronomical and space-environmental information;

e. transmitting said astronomical and space-environmental information via electronic output and communications means to at least one planet-based station having means for receiving said astronomical and space-environmental information, said planet-based station comprising:

i. display means, ii. retransmission means, iii. signal processing, and interpretation means, and iv. communications, command and control means.

2. The method defined in claim 1 wherein the detection means includes both active and passive detection means.

3. The method defined in claim 1 wherein the monitoring means provided is such that it essentially avoids atmospheric disturbance(s) and limitation(s) and distorted views of space.

4. The method defined in claim 3 wherein foreign bodies' position, size, color, and motion are monitored.

5. The method defined in claim 1 wherein said operating and orienting of said collection means is independent of said telecommunications satellite.

6. The method defined in claim 1 wherein the astronomical and space environmental information is provided to users including specialists, subscribers and the public.

7. The method defined in claim 2 wherein said active detection means includes visible, infra red, ultra violet, radio illumination and detection and physical sampling.

8. The method defined in claim 1 wherein the astronomical and space-environmental information includes at least one of the members selected from the group consisting of (a) measurements of solar wind; (b) particulates including micrometeorites, temperature, and magnetic field strength; (c) aggregated data; (d) non-aggregated data; (e) image data; and (f) non-image data.

* * * * *